Figure 1:
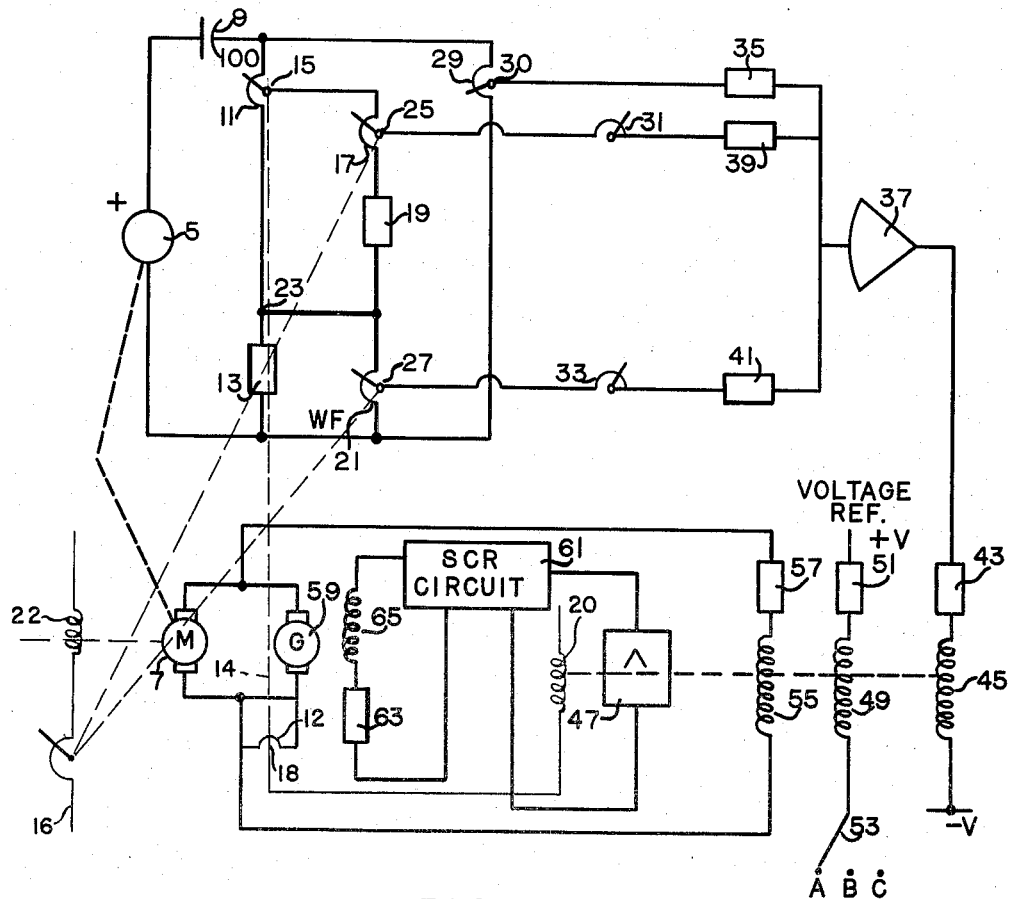

INVENTORS
KENNETH G. BLACK
PAUL E. DORNBUSCH
BY
J.T. Comfort
ATTORNEY

United States Patent Office 3,237,074
Patented Feb. 22, 1966

3,237,074
VOLTAGE REGULATION FOR DIRECT CURRENT MOTORS
Kenneth G. Black, Scotia, N.Y., and Paul E. Dornbusch, Roanoke, Va., assignors to General Electric Company, a corporation of New York
Filed Apr. 25, 1963, Ser. No. 275,696
1 Claim. (Cl. 318—308)

This invention relates to a voltage regulation system for direct current motors and more particularly to a voltage regulation system for motors used in such operations as drives for tandem cold mills.

Voltage regulators are commonly used in tandem cold mill main drives rather than speed regulators. Thus, when metal enters a stand, the current increases from a very low value and the motor slows down.

The steady-state equation of a direct current motor is as follows:

$$V_T = K_v W + IR_M$$

where $V_T$ = motor terminal voltage
$W$ = motor speed
$R_M$ = motor armature resistance
$I$ = motor current
$K_v$ = constant proportional to field flux $V_T$, the motor terminal voltage, is controlled by a voltage regulator.

It is customary to include as a part of the volage regulator, apparatus for IR compensation. This is accomplished by feeding into the regulator a signal proportional to the motor current, so that $V_T$ is increased as the motor current increases. If the feedback signal is large enough to raise $V_T$ by an amount $IR_M$, this is termed 100% IR compensation; and the steady-state speed is the same for all values of I.

However, the current feedback signal used for IR compensation is a positive feedback and decreases the stability of the system. For instance, if the system has been stabilized properly for a low value of IR compensation and the IR compensation is increased, the system will become less stable than desired.

In addition, the system is less stable for high values of field flux than for low values. Also, if the field flux is changed after the stabilization is accomplished, the system will be more or less stable than desired. To be too stable is to be sluggish and slow in response.

It is therefore an object of this invention to provide a new and improved voltage regulating system for direct current motors.

Another object of this invention is to provide a new and improved voltage regulating system which is automatically stabilized.

Still another object of this invention is to provide a new and improved voltage regulating system which is automatically stabilized for all values of IR compensation.

Yet another object of this invention is to provide a new and improved voltage regulating system which is automatically stabilized for all values of field flux.

And another object of this invention is to provide a new and improved voltage regulating system which is automatically stabilized for all values of field flux and IR compensation.

According to this invention, therefore, the motor control system having a motor and a voltage regulator is stabilized. A tachometer mounted on the shaft of the direct current motor produces a signal proportional to the motor speed. The tachometer signal is filtered, differentiated, and applied to the voltage regulator to maintain the stability of the system. To counteract the loss of stability from the IR compensation, the stabilizing signal may be increased proportional to an increase in the IR compensation. The stabilizing signal may also be increased proportional to a change in the field flux.

The invention is set forth with particularity in the appended claim. The principles and characteristics of the invention, as well as other objects and advantages are revealed and discussed through the medium of the illustrative embodiments appearing in the specification and drawing which follow.

Figure 2:
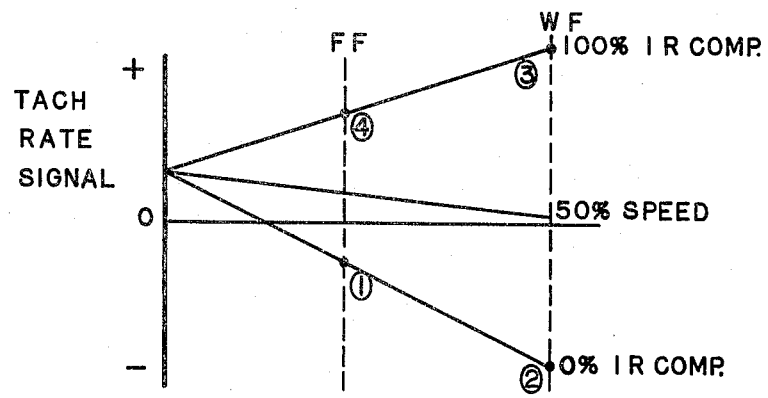

In the drawing:
FIG. 1 shows a schematic of a voltage regulating system constructed in accordance with the principles of this invention.
FIG. 2 shows the tachometer signal as it varies with IR compensation and field control.

Referring now to FIG. 1 a tachometer 5 is mounted on the shaft of a D.C. motor 7. Capacitor 9 is a filter and differentiating circuit connected to the positive terminal of the tachometer 5. A transformer could be substituted for capacitor 9 to act as the filter and differentiating circuit. Rheostat 11 having one terminal connected to the capacitor 9 and the other terminal through resistor 13 to the negative terminal of the tachometer 5 has its sliding contact finger 15 connected on the same shaft as the IR compensation rheostat 12. The IR compensation rheostat is operated by the operator to set the IR compensation to compensate for the IR drop of the motor 7. As the IR compensation factor is set, the setting is reflected in the setting of rheostat 11. The IR compensation rheostat 12 is connected across a series field 14 of the generator 59, and has its slider 18 connected to a control winding 20 of magnetic amplifier 47.

The sliding contact finger 15 is connected to one terminal of rheostat 17 with the other terminal of rheostat 17 connected through resistor 19 to one terminal of rheostat 21 and also to point 23 between resistor 13 and rheostat 11. Rheostat 17 has its sliding contact finger 25 connected on the same shaft as the field control rheostat of motor 7. The field control rheostat itself is not shown, but is set by the operator to determine the stand speed. The setting of the field control rheostat is reflected in the setting of the rheostat 17.

The other terminal of the rheostat 21 is connected to the negative terminal of the tachometer 5 with its sliding contact finger 27 connected on the same shaft as the field control rheostat which controls the field of motor 7. The field control rheostat 16 controls the speed of the motor 7 and is connected to the motor field winding 22 by controlling the field applied to the motor 7. The setting of the field control rheostat is reflected therefore in the setting of rheostat 21.

Rheostats 29, 31 and 33 are tune up rheostats to obtain the desired response for different input voltages to the voltage regulator. Rheostat 29 with one terminal connected through capacitor 9 to the positive terminal of the tachometer 5 and the other terminal connected directly to the negative terminal of tachometer 5 has its sliding contact finger 30 connected through resistor 35 to the operational amplifier 37. Rheostat 31 has one terminal connected to the sliding contact finger 25 of rheostat 17 and the other terminal connected with its sliding contact finger through resistor 39 to the operational amplifier 37. Rheostat 33 has one terminal connected to the sliding contact finger 27 of rheostat 21 and the other terminal connected with its sliding contact finger through resistor 41 to the operational amplifier.

Operational amplifier 37 is connected through resistor 43 to a control winding 45 of magnetic amplifier 47. The other end of control winding 45 is connected to a reference or zero potential bus.

Control winding 49 providing the voltage reference is connected through resistor 51 to a positive potential and may be connected through a switch 53 to one of a plurality of negative voltage points A, B or C. The switch is moved to the voltage points by an operator to select the desired speed of the motor. Only three voltage points are shown, but there may be as many as desirable. One or more of such voltage points may be connected to increasing or decreasing voltages, which are supplied by other apparatus. Control winding 55 of magnetic amplifier 47 has one terminal connected to the terminals of motor 7 and generator 59, and the other terminal connected through resistor 57 to the other terminals of motor 7 and generator 59. Control winding 55 thus introduces into the voltage regulator a signal proportional to the voltage of motor 7 and generator 59.

Magnetic amplifier 47 is connected to the SCR circuit 61 to control the firing of the SCR circuit 61. The SCR circuit 61 is connected through resistor 63 to the excitation field 65 of generator 59 to control the generator 59. The motor 7 and generator 59 are connected in the normal manner for motor-generator sets.

The motor-generator set 7 and 59 drives the main drive of a tandem cold mill. Identical sets drive the other drives of the tandem cold mill.

Operation

The operator selects a voltage reference point A, B or C depending on the desired speed of the motor 7 and connects the switch 53 to the selected voltage point. Current flows in control winding 49 producing an output in the magnetic amplifier 47 to fire the SCR circuit 61. The SCR circuit 61 when fired causes current to flow in the excitation winding 65 of generator 59, operating generator 59 to run the motor 7. The signal proportional to motor voltage taken from the terminals of generator 59 and motor 7 is applied to control winding 55 as a feedback signal to modify the reference voltage applied to control winding 49.

Tachometer 5 measures the speed of the shaft of motor 7 and develops a signal proportional to the speed. The tachometer signal is filtered and differentiated by capacitor 9.

The IR compensation rheostat and the field rheostat are set by the operator at the desired values. These rheostats are not shown. Rheostat 11 with its sliding contact finger 15 connected to the shaft of the IR compensation rheostat reflects the setting of the IR compensation rheostat. Rheostat 17 with its sliding contact finger 25 connected to the shaft of the field rheostat reflects the setting of the field rheostat. Rheostat 21 with its sliding contact finger 27 connected to the shaft of the field rheostat reflects the setting of the field rheostat.

Rheostats 29, 31 and 33 may be used as tune up rheostats.

The tachometer feedback signal is modified by the setting of rheostats 11, 17 and 21 according to the settings of the IR compensation rheostat and the field rheostat, amplified by operational amplifier 37 and applied to the control winding 45 of magnetic amplifier 47. The current flowing through control winding 45 in accordance with the modified tachometer feedback signal modifies the signal in the voltage reference control winding 49 to stabilize the voltage regulator. It can be seen that the tachometer feedback signal is increased proportional to an increase in the IR compensation as indicated by rheostat 11 and also recalibrated proportional to a change in the field flux as indicated by rheostats 17 and 21.

In summary, a new and improved voltage regulation system for direct current motors has been described in which the voltage regulation system is automatically stabilized. A tachometer is connected to the shaft of the motor and a signal taken from the tachometer is fed back into the voltage regulator to stabilize the system. The tachometer feedback signal may be modified by the amount of IR compensation and the change in the field flux.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

In a system for controlling a direct current motor by a voltage regulator, a tachometer coupled to said motor for producing a signal proportional to the speed of the motor, a first rheostat connected to said tachometer for modifying said signal according to changes in the IR compensation applied to the motor, a second rheostat connected to said tachometer for further modifying said signal according to the changes in the motor field flux, and means for applying said modified signal to the voltage regulator to stabilize the system.

References Cited by the Examiner
UNITED STATES PATENTS

| | | | |
|---|---|---|---|
| 2,845,586 | 7/1958 | Stringer | 318—143 X |
| 2,858,493 | 10/1958 | Hull et al. | 318—146 |
| 3,026,463 | 3/1962 | Wolke et al. | 318—327 |
| 3,036,254 | 5/1962 | Hawkins et al. | 318—143 |
| 3,037,157 | 5/1962 | Young | 318—327 X |
| 3,147,416 | 9/1964 | Grunbaum | 318—308 |

ORIS L. RADER, *Primary Examiner.*

S. GORDON, *Assistant Examiner.*